United States Patent
Prasad et al.

(10) Patent No.: US 10,873,867 B2
(45) Date of Patent: Dec. 22, 2020

(54) METHOD, APPARATUS, AND COMPUTER PROGRAM PRODUCT FOR IMPROVING RELIABILITY IN WIRELESS COMMUNICATION

(71) Applicant: Nokia Technologies Oy, Espoo (FI)

(72) Inventors: Athul Prasad, Helsinki (FI); Mikko A. Uusitalo, Helsinki (FI); Zexian Li, Espoo (FI); Petteri Lunden, Espoo (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 16/313,361

(22) PCT Filed: Jun. 27, 2016

(86) PCT No.: PCT/US2016/039514
§ 371 (c)(1),
(2) Date: Dec. 27, 2018

(87) PCT Pub. No.: WO2018/004509
PCT Pub. Date: Jan. 4, 2018

(65) Prior Publication Data
US 2019/0174337 A1 Jun. 6, 2019

(51) Int. Cl.
*H04W 24/04* (2009.01)
*H04W 24/10* (2009.01)
(Continued)

(52) U.S. Cl.
CPC .......... *H04W 24/04* (2013.01); *H04B 7/0639* (2013.01); *H04B 7/0695* (2013.01);
(Continued)

(58) Field of Classification Search
CPC .... H04W 24/04; H04W 24/10; H04B 7/0695; H04B 7/088; H04B 7/0639; H04B 17/309; H04L 41/0668
See application file for complete search history.

(56) References Cited

U.S. PATENT DOCUMENTS 6,008,759 A * 12/1999 Tangemann ............ G01S 3/28
342/368
7,783,451 B2 * 8/2010 Wilcox .................. G01S 13/825
340/5.61
(Continued)

FOREIGN PATENT DOCUMENTS

WO WO2016086144 A1 6/2016

OTHER PUBLICATIONS

International Search Report for International Application No. PCT/US2016/039514 dated Aug. 3, 2017.

*Primary Examiner* — Hoang-Chuong Q Vu
(74) *Attorney, Agent, or Firm* — Locke Lord LLP

(57) ABSTRACT

An example embodiment includes measuring by a user equipment, at least a signal quality and angle-of-arrival of wireless signals received from a network node; determining, by the user equipment, that the received wireless signals include signals from both primary path wireless beams and/or received reflected path wireless beams, based on the signal quality and the angle of arrival of the wireless signals; ranking, by the user equipment, the received wireless signals to primary path wireless beams and/or received reflected path wireless beams, based on the signal quality; and transmitting, by the user equipment, to the network node, at least one report including indications of both the received primary wireless beams having the best overall signal quality among both the primary and reflected beams, and received reflected path wireless beams having the best signal quality among the received reflected path wireless beams.

18 Claims, 11 Drawing Sheets

(51) Int. Cl.
*H04B 17/309* (2015.01)
*H04L 12/24* (2006.01)
*H04B 7/06* (2006.01)
*H04B 7/08* (2006.01)

(52) U.S. Cl.
CPC .......... H04B 7/088 (2013.01); H04B 17/309 (2015.01); H04L 41/0668 (2013.01); H04W 24/10 (2013.01)

(56) References Cited

U.S. PATENT DOCUMENTS

| | | | | |
|---|---|---|---|---|
| 2006/0116092 A1* | 6/2006 | Uno | ................ | H04B 7/0408 455/134 |
| 2008/0198072 A1* | 8/2008 | Elwell | ................ | G01S 5/0273 342/450 |
| 2011/0105032 A1* | 5/2011 | Maruhashi | ........... | H04B 7/0617 455/59 |
| 2012/0002681 A1* | 1/2012 | Inohiza | ................ | H04L 1/0003 370/437 |
| 2013/0155847 A1 | 6/2013 | Li et al. | | |
| 2014/0146739 A1* | 5/2014 | Zhang | ................ | H04B 7/15 370/315 |
| 2014/0249771 A1* | 9/2014 | Yang | ................ | G01S 5/0252 702/150 |
| 2014/0286156 A1* | 9/2014 | Kohli | ................ | H04W 40/34 370/225 |
| 2015/0071107 A1 | 3/2015 | Endo et al. | | |
| 2015/0234033 A1* | 8/2015 | Jamieson | ................ | G01S 5/04 455/456.1 |
| 2015/0236772 A1* | 8/2015 | Hammarwall | ....... | H04B 7/0617 370/329 |
| 2016/0198474 A1* | 7/2016 | Raghavan | ........... | H04B 7/0639 370/335 |
| 2016/0345286 A1* | 11/2016 | Jamieson | ................ | G01S 3/023 |
| 2017/0194706 A1* | 7/2017 | Lee | ................ | H04B 7/0619 |
| 2017/0195893 A1* | 7/2017 | Lee | ................ | H04L 5/006 |
| 2017/0244451 A1* | 8/2017 | Raghavan | ........... | H04B 17/336 |
| 2018/0176057 A1* | 6/2018 | Huang | ................ | H04L 27/2666 |

* cited by examiner

FIG. 4

| Location | Direct Beams | | | | Reflected Beams | | | |
|---|---|---|---|---|---|---|---|---|
| | Beam ID/Signal Strength – 1 | Beam ID/Signal Strength – 2 | ... | Beam ID/Signal Strength – m | Beam ID/Signal Strength – 1 | Beam ID/Signal Strength – 2 | ... | Beam ID/Signal Strength – k |
| $L_1$ | $B_{11}/RSRP_{11}$ | ... | ... | $B_{m1}/RSRP_{m1}$ | $B_{11}/RSRP_{11}$ | ... | ... | $B_{k1}/RSRP_{k1}$ |
| $L_2$ | $B_{12}/RSRP_{12}$ | ... | ... | $B_{m2}/RSRP_{m2}$ | $B_{12}/RSRP_{12}$ | ... | ... | $B_{k2}/RSRP_{k2}$ |
| $L_n$ | $B_{1n}/RSRP_{1n}$ | ... | ... | $B_{mn}/RSRP_{mn}$ | $B_{1n}/RSRP_{1n}$ | ... | ... | $B_{kn}/RSRP_{kn}$ |

Step 702: measuring by a user equipment, at least a signal quality and angle-of-arrival of wireless signals received from a network node;

⟶

Step 704: determining, by the user equipment, that the received wireless signals include signals from both primary path wireless beams and/or received reflected path wireless beams, based on the signal quality and the angle of arrival of the wireless signals;

⟶

Step 706: ranking, by the user equipment, the received wireless signals to primary path wireless beams and/or received reflected path wireless beams, based on the signal quality; and

⟶

Step 708: transmitting, by the user equipment, to the network node, at least one report including indications of both the received primary wireless beams having the best overall signal quality among both the primary and reflected beams, and received reflected path wireless beams having the best signal quality among the received reflected path wireless beams.

FIG. 7B

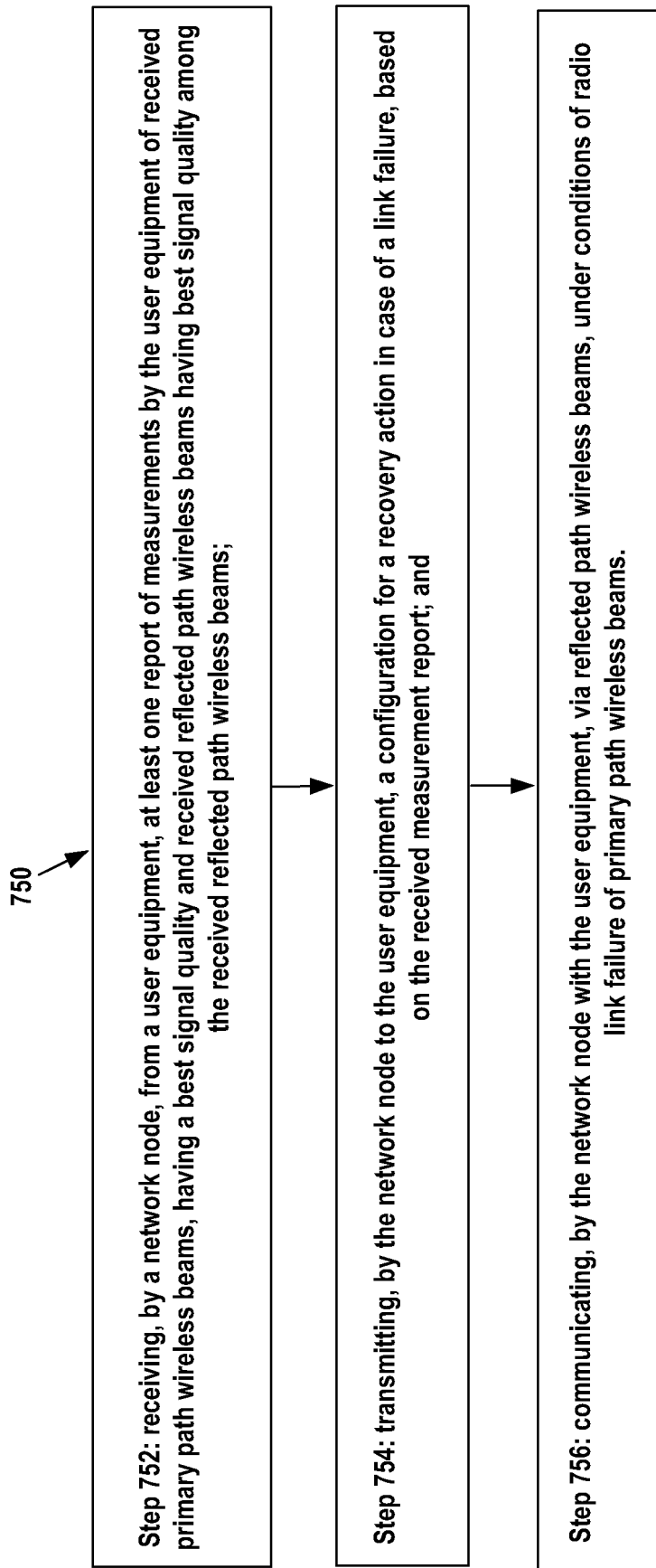

750

Step 752: receiving, by a network node, from a user equipment, at least one report of measurements by the user equipment of received primary path wireless beams, having a best signal quality and received reflected path wireless beams having best signal quality among the received reflected path wireless beams;

Step 754: transmitting, by the network node to the user equipment, a configuration for a recovery action in case of a link failure, based on the received measurement report; and Step 756: communicating, by the network node with the user equipment, via reflected path wireless beams, under conditions of radio link failure of primary path wireless beams.

METHOD, APPARATUS, AND COMPUTER PROGRAM PRODUCT FOR IMPROVING RELIABILITY IN WIRELESS COMMUNICATION

FIELD

The technology field relates to wireless wide-area networks, and more particularly to enhancement to wide-area network based radio link reliability.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

The Fifth Generation (5G) wireless communications technology is expected to use high-frequency carriers of between 10 and 300 gigahertz (GHz), in the millimeter-wave band (mmWave), enabling the transmission of higher speed, higher-quality multimedia content. Cellular network architecture is expected to implement the mmWave wireless communications technology, with implementations ranging in size from stationary base stations serving kilometer-sized cells, to portable base stations serving microcells, femtocells or picocells.

Although mmWave radiofrequencies provide a significant bandwidth advantage in telecommunications, the high frequency mmWave carriers are subject to rain attenuation and atmospheric absorption during propagation and have a decreased signal penetration through or around obstacles, resulting in a large path loss. High frequency mmWave carriers are highly directional, permitting communication paths to operate close to one another without causing interference. Where a line-of-sight (LOS) path exists between the transmitter and receiver, the advantages of very high speed data transmission using mmWave carriers may be obtained for ranges of up to approximately one kilometer.

Fifth generation networks are currently being designed to provide a variety of services such as extreme mobile broadband, massive machine type of communications and ultra-reliable low-latency communications. While there would be various types of network nodes providing connectivity in 5G, one of the key enablers for supporting these use cases is through the deployment of ultra-dense 5G-Radio Access Points (RAPs) operating in higher frequency bands such as millimeter wave. One of the key drawbacks of using such bands is the lack of link reliability, with a much higher probability of radio link failures (RLFs), for example due to the line-of-sight (LOS) requirement. Various mechanisms are currently being studied, such as multi-connectivity where data is sent through multiple radio links in order to improve reliability and capacity.

Various network entities involved in legacy radio access technologies (RATs) are shown in FIG. 1, for optimizing the radio access network (RAN) operation in the core network 102. The wireless user equipment (UE) 100 is shown located in a cell controlled by the evolved Node B (eNodeB or eNB) base station 101. The UE 100 may measure the signal quality information of the signals from the base station eNB 101

The UE 100 is shown transmitting radio measurements to the eNB base station 101, such as the signal quality and propagation characteristics to the base station eNB 101. There are various network analytics and optimization entities available in legacy radio access technologies such as long-term evolution (LTE), which enable the optimization of the radio access networks (RAN). These entities include self-organizing network (SON) function 104, which collects various information from the RAN in order to optimize the RAN operation. Another feature is minimization of drive test (MDT) feature where the network can configure the user equipment (UE) 100 to configure various measurements and report it in either real-time or non-real-time, in order to generate the radio environment maps, thereby minimizing the need for manual drive tests. The measurement reports are sent by the RAN to the trace collection entity (TCE) 108, which is then used by network analytics and visualization tools 106 to generate such maps. Also shown in the figure is an operations, administration, and maintenance system (OAM). In 5G, in order to exploit the new propagation properties of the UEs in the frequency bands in which they operate, the existing network functions should be enhanced, in order to improve the quality of experience for the end users. This would also mean new measurements and assistance information from the UEs and 5G-Radio Access Points (RAPs) to enable such functions.

The problem is especially severe in indoor environments, where majority of the ultra-dense network (UDN) deployments are expected, with independently operating 5G-RAPs. One straightforward solution would be to densify the network, so that there is always one active link from a RAP available to all the UEs at all locations, even if there is a radio link failure (RLF) in some of the active links. However, this would lead to a significant increase in the operation expenditure for the network operator, and even in this case, ensuring reliability at all times is not feasible due to at least strong inter-cell interference, unless tight cooperation exists among all small cells. Thus, new methods are required to enable the network to provide better radio link reliability to the end users, with the help of enhanced assistance information to the network. Also, due to the dynamic nature of the radio environment, non-line-of-sight (NLOS) conditions may occur randomly due to other users moving around and blocking the line-of-sight of active users, or random situations that may occur in an indoor environment, such as moving the position of furniture.

SUMMARY

Method, apparatus, and computer program product example embodiments enable enhancement to wide-area network based radio link reliability.

An example embodiment of the invention includes a method comprising:

measuring by a user equipment, at least a signal quality and angle-of-arrival of wireless signals received from a network node;

determining, by the user equipment, that the received wireless signals include signals from both primary path wireless beams and/or received reflected path wireless beams, based on the signal quality and the angle of arrival of the wireless signals;

ranking, by the user equipment, the received wireless signals to primary path wireless beams and/or received reflected path wireless beams, based on the signal quality; and transmitting, by the user equipment, to the network node, at least one report including indications of both the received primary wireless beams having the best overall signal quality among both the primary and reflected beams, and received reflected path wireless beams having the best signal quality among the received reflected path wireless beams.

An example embodiment of the invention includes a method comprising:

wherein primary path wireless beams include at least one of beams propagated along a direct line-of-sight path and beams propagated along a direction slightly off the direct line-of-sight path.

An example embodiment of the invention includes a method comprising:

wherein reflected path wireless beams include at least beams propagated along a path that is significantly different from the primary path in terms of at least one of angle-of-arrival and time-difference-of-arrival.

An example embodiment of the invention includes a method comprising:

receiving, by the user equipment, from the network node, a recovery configuration message for recovery action in an event of a radio link failure of primary path wireless beams;

detecting, by the user equipment, a radio link failure of primary path wireless beams; and exchanging, by the user equipment, with the network node, wireless communications via reflected path wireless beams, under conditions of radio link failure of primary path wireless beams, based on the recovery configuration message.

An example embodiment of the invention includes a method comprising:

wherein the user equipment is located in a cell controlled by the network node and the network node is a cellular base station, which operates in a high frequency band.

An example embodiment of the invention includes a method comprising:

wherein the user equipment transmits uplink data to the network node using the same path as used by the reflected path wireless beams, under the conditions of radio link failure of primary path wireless beams.

An example embodiment of the invention includes a method comprising:

wherein the at least one report includes information on signal quality and angle-of-arrival of received primary path wireless beams and/or signal quality and angle-of-arrival of received reflected path wireless beams having a substantially different angle-of-arrival than that of the received primary path wireless beams.

An example embodiment of the invention includes a method comprising:

wherein the recovery configuration message includes information on paths for the reflected path wireless beams.

An example embodiment of the invention includes a method comprising:

receiving, by the user equipment, from the network node, a measurement configuration specifying measurement criteria for at least one of Angle-of-Arrival of reflected path wireless beams, time difference of arrival of reflected path wireless beams with respect to arrival of received primary path wireless beams, threshold values for signal quality and threshold values for received signal strength of the received primary path wireless beams and received reflected path wireless beams.

An example embodiment of the invention includes a method comprising:

receiving, by a network node, from a user equipment, at least one report of measurements by the user equipment of received primary path wireless beams, having a best signal quality and received reflected path wireless beams having best signal quality among the received reflected path wireless beams;

transmitting, by the network node to the user equipment, a configuration for a recovery action in case of a link failure, based on the received measurement report; and communicating, by the network node with the user equipment, via reflected path wireless beams, under conditions of radio link failure of primary path wireless beams.

An example embodiment of the invention includes a method comprising:

wherein primary path wireless beams include at least one of beams propagated along a direct line-of-sight path and beams propagated along a direction slightly off the direct line-of-sight path.

An example embodiment of the invention includes a method comprising:

wherein reflected path wireless beams include at least beams propagated along a path that is significantly different from the primary path in terms of at least one of angle-of-arrival and time-difference-of-arrival.

An example embodiment of the invention includes a method comprising:

transmitting, by the network node, to a self-organizing network function, information on the reflected path wireless beams used under the conditions of radio link failure of primary path wireless beams.

An example embodiment of the invention includes a method comprising:

transmitting, by the network node, to the user equipment, a measurement configuration specifying measurement criteria for Angle-of-Arrival of reflected path wireless beams, time difference of arrival of reflected path wireless beams with respect to arrival of received primary path wireless beams, and threshold values for signal quality and threshold values for received signal strength of the received primary path wireless beams and received reflected path wireless beams.

An example embodiment of the invention includes a method comprising:

wherein the at least one report includes information on signal quality and angle-of-arrival of received primary path wireless beams and signal quality and angle-of-arrival of received reflected path wireless beams having a substantially different angle-of-arrival than that of the received primary path wireless beams.

An example embodiment of the invention includes an apparatus comprising: at least one processor;

at least one memory including computer program code;

the at least one memory and the computer program code configured to, with the at least one processor, cause the apparatus at least to:

measure at least a signal quality and angle-of-arrival of wireless signals received from a network node;

determine that the received wireless signals include signals from both primary path wireless beams and/or received reflected path wireless beams, based on the signal quality and the angle of arrival of the wireless signals;

rank the received wireless signals to primary path wireless beams and/or received reflected path wireless beams, based on the signal quality; and transmit to the network node, at least one report including indications of both the received primary wireless beams having the best overall signal quality among both the primary and reflected beams, and received reflected path wireless beams having the best signal quality among the received reflected path wireless beams.

An example embodiment of the invention includes an apparatus comprising:

wherein primary path wireless beams include at least one of beams propagated along a direct line-of-sight path and beams propagated along a direction slightly off the direct line-of-sight path.

An example embodiment of the invention includes an apparatus comprising:

wherein reflected path wireless beams include at least beams propagated along a path that is significantly different from the primary path in terms of at least one of angle-of-arrival and time-difference-of-arrival.

An example embodiment of the invention includes an apparatus comprising:

the at least one memory and the computer program code configured to, with the at least one processor, cause the apparatus at least to:

receive from the network node, a recovery configuration message for recovery action in an event of a radio link failure of primary path wireless beams;

detect a radio link failure of primary path wireless beams; and exchange with the network node, wireless communications via reflected path wireless beams, under conditions of radio link failure of primary path wireless beams, based on the recovery configuration message.

An example embodiment of the invention includes an apparatus comprising:

wherein the user equipment is located in a cell controlled by the network node and the network node is a cellular base station, which operates in a high frequency band.

An example embodiment of the invention includes an apparatus comprising:

wherein the user equipment transmits uplink data to the network node using the same path as used by the reflected path wireless beams, under the conditions of radio link failure of primary path wireless beams.

An example embodiment of the invention includes an apparatus comprising:

wherein the at least one report includes information on signal quality and angle-of-arrival of received primary path wireless beams and/or signal quality and angle-of-arrival of received reflected path wireless beams having a substantially different angle-of-arrival than that of the received primary path wireless beams.

An example embodiment of the invention includes an apparatus comprising:

wherein the recovery configuration message includes information on paths for the reflected path wireless beams.

An example embodiment of the invention includes an apparatus comprising:

the at least one memory and the computer program code configured to, with the at least one processor, cause the apparatus at least to:

receive from the network node, a measurement configuration specifying measurement criteria for at least one of Angle-of-Arrival of reflected path wireless beams, time difference of arrival of reflected path wireless beams with respect to arrival of received primary path wireless beams, threshold values for signal quality and threshold values for received signal strength of the received primary path wireless beams and received reflected path wireless beams.

An example embodiment of the invention includes an apparatus comprising: at least one processor;

at least one memory including computer program code; the at least one memory and the computer program code configured to, with the at least one processor, cause the apparatus at least to:

receive from a user equipment, at least one report of measurements by the user equipment of received primary path wireless beams, having a best signal quality and received reflected path wireless beams having best signal quality among the received reflected path wireless beams;

transmit to the user equipment, a configuration for a recovery action in case of a link failure, based on the received measurement report; and communicate with the user equipment, via reflected path wireless beams, under conditions of radio link failure of primary path wireless beams.

An example embodiment of the invention includes an apparatus comprising:

wherein primary path wireless beams include at least one of beams propagated along a direct line-of-sight path and beams propagated along a direction slightly off the direct line-of-sight path.

An example embodiment of the invention includes an apparatus comprising:

wherein reflected path wireless beams include at least beams propagated along a path that is significantly different from the primary path in terms of at least one of angle-of-arrival and time-difference-of-arrival.

An example embodiment of the invention includes an apparatus comprising:

the at least one memory and the computer program code configured to, with the at least one processor, cause the apparatus at least to:

transmit to a self-organizing network function, information on the reflected path wireless beams used under the conditions of radio link failure of primary path wireless beams.

An example embodiment of the invention includes an apparatus comprising:

the at least one memory and the computer program code configured to, with the at least one processor, cause the apparatus at least to:

transmit to the user equipment, a measurement configuration specifying measurement criteria for Angle-of-Arrival of reflected path wireless beams, time difference of arrival of reflected path wireless beams with respect to arrival of received primary path wireless beams, and threshold values for signal quality and threshold values for received signal strength of the received primary path wireless beams and received reflected path wireless beams.

An example embodiment of the invention includes an apparatus comprising:

wherein the at least one report includes information on signal quality and angle-of-arrival of received primary path wireless beams and signal quality and angle-of-arrival of received reflected path wireless beams having a substantially different angle-of-arrival than that of the received primary path wireless beams.

An example embodiment of the invention includes a computer program product comprising computer executable program code recorded on a computer readable, non-transitory storage medium, the computer executable program code comprising:

code for measuring by a user equipment, at least a signal quality and angle-of-arrival of wireless signals received from a network node;

code for determining, by the user equipment, that the received wireless signals include signals from both primary path wireless beams and/or received reflected path wireless beams, based on the signal quality and the angle of arrival of the wireless signals;

code for ranking, by the user equipment, the received wireless signals to primary path wireless beams and/or received reflected path wireless beams, based on the signal quality; and code for transmitting, by the user equipment, to the network node, at least one report including indications of both the received primary wireless beams having the best overall signal quality among both the primary and reflected beams, and received reflected path wireless beams having the best signal quality among the received reflected path wireless beams.

An example embodiment of the invention includes a computer program product comprising computer executable program code recorded on a computer readable, non-transitory storage medium, the computer executable program code comprising:

code for receiving, by a network node, from a user equipment, at least one report of measurements by the user equipment of received primary path wireless beams, having a best signal quality and received reflected path wireless beams having best signal quality among the received reflected path wireless beams;

code for transmitting, by the network node to the user equipment, a configuration for a recovery action in case of a link failure, based on the received measurement report; and code for communicating, by the network node with the user equipment, via reflected path wireless beams, under conditions of radio link failure of primary path wireless beams.

DESCRIPTION OF THE FIGURES

FIG. 4: illustrates an example radio reflection environment map 400 generated based on UE 100 measurements, in accordance with an example embodiment of the invention.

FIG. 7A is a flow diagram 700 of a programmed method executed by the UE 100 reporting to the 5G-RAP 110 the best signal quality primary beams 1 and the best signal quality reflected beams 2 having a substantially different angle-of-arrival due to reflection at reflective surface 115 in the transmission path of the secondary beam 2, in accordance with an example embodiment of the invention.

FIG. 7B is a flow diagram 750 of a programmed method executed by the 5G-RAP 110 compiling a radio reflection environment map 400 based on a measurement report 600 received from the UE 100, indicating the best signal quality primary beams 1 and the best signal quality reflected beams 2 received by the UE 100 having a substantially different angle-of-arrival due to reflection at reflective surface 115 in the transmission path of the secondary beam 2, in accordance with an example embodiment of the invention.

DISCUSSION OF EXAMPLE EMBODIMENTS OF THE INVENTION

Figure 1:
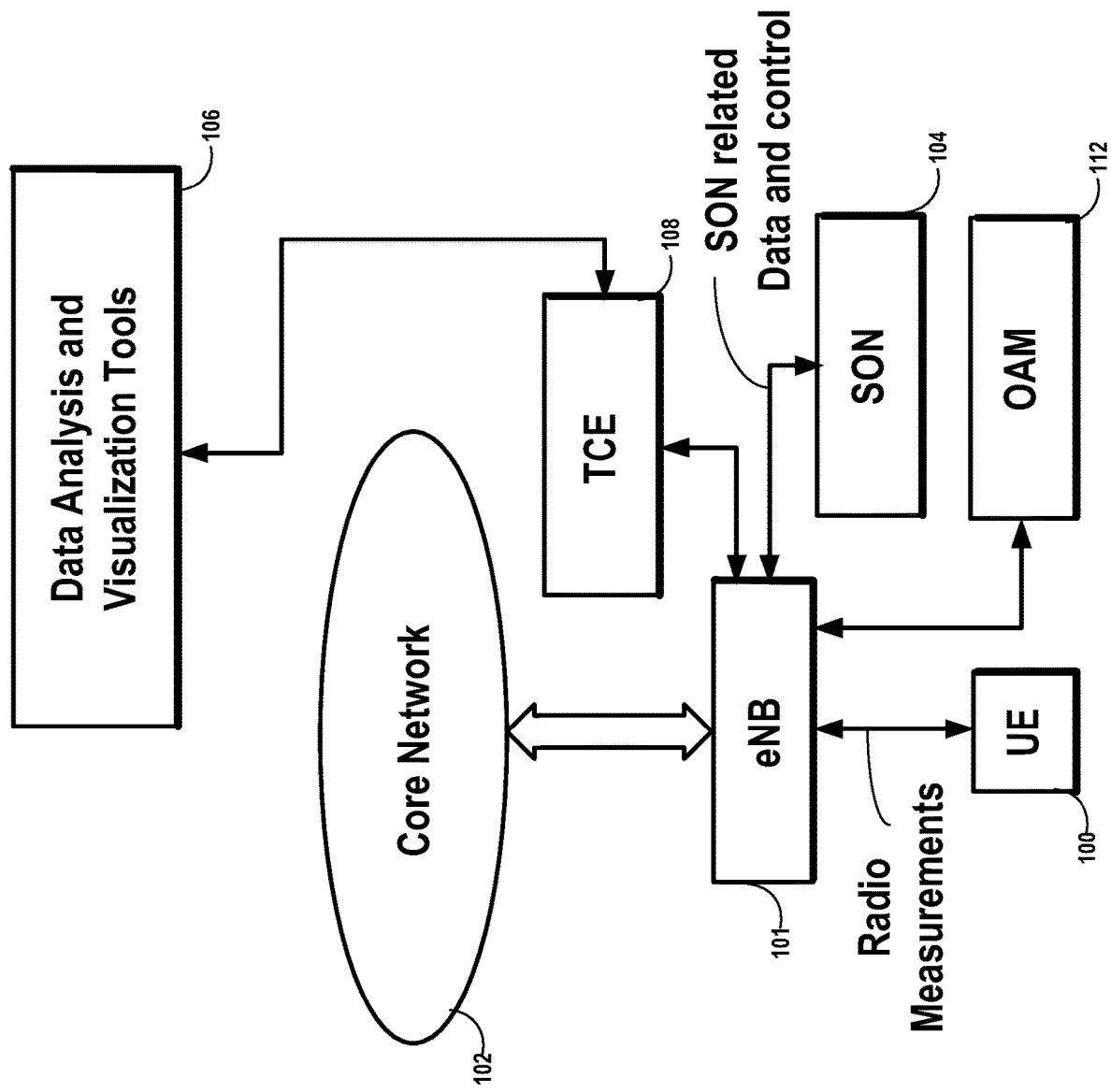
FIG. 1 illustrates various network components involved in legacy radio access technologies (RATs), for optimizing the radio access network (RAN) operation in the core network 102.
Figure 2:
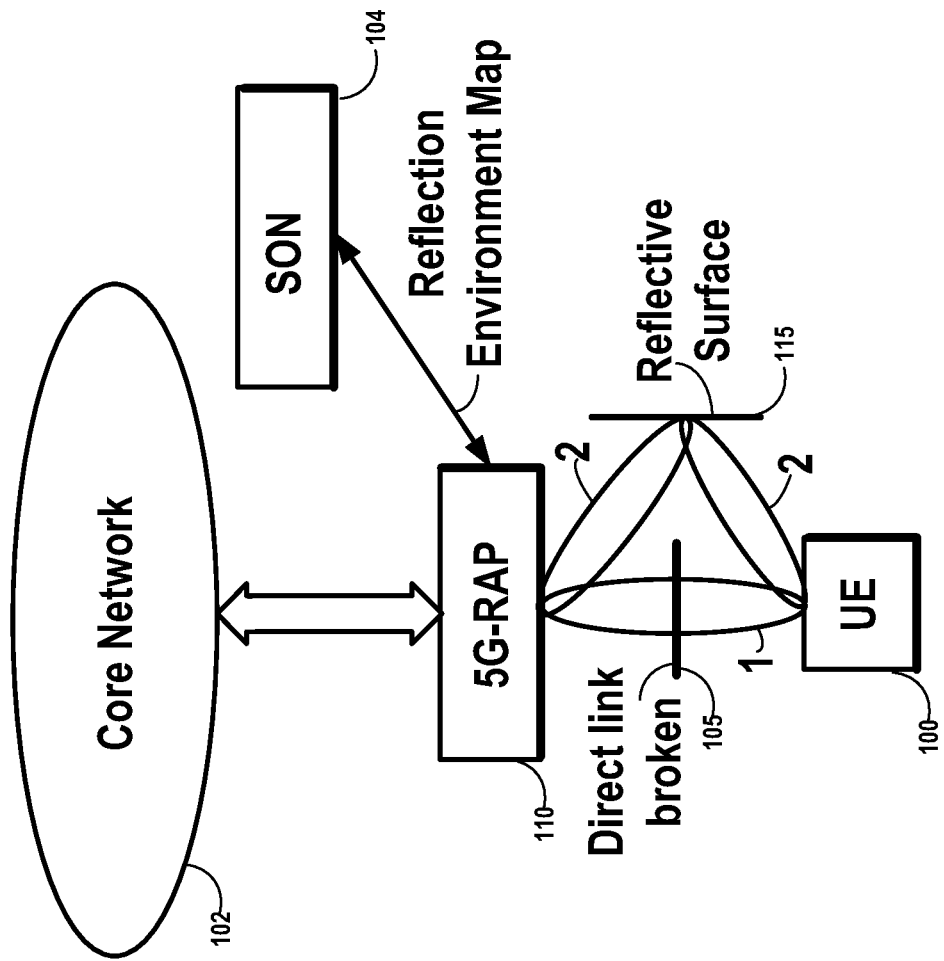
FIG. 2: illustrates an example network diagram of a user equipment (UE) 100 located in a cell controlled by a 5G radio access point (5G-RAP) 110. The UE 100 is capable of reporting to the 5G-RAP 110 the strongest or best signal quality received primary beams 1 and the strongest or best signal quality received secondary beams 2 having a substantially different angle-of-arrival due to reflection at reflective surface 115 in the transmission path of the secondary beam 2. The figure shows the primary beam 1 having been blocked by an obstruction 105 in the line-of-sight (LOS) of the primary beam 1, causing the UE 100 and 5G-RAP 110 to select the secondary beam 2 for wireless communication, in accordance with an example embodiment of the invention.

In accordance with an example embodiment of the invention, the radio reflection environment surrounding a user equipment (UE) in a cell managed by a 5G radio access point (5G-RAP), is used in building a self-organizing network. In accordance with an example embodiment of the invention, FIG. 2 illustrates an example network diagram of a user equipment (UE) 100 located in a cell controlled by a 5G radio access point (5G-RAP) 110. The UE 100 is capable of reporting to the 5G-RAP 110 the strongest or best signal quality received primary or direct beams 1 and the strongest or best signal quality received secondary or reflected beams 2 having a substantially different angle-of-arrival due to reflection at reflective surface 115 in the transmission path of the secondary or reflected beam 2. The figure shows the primary beam 1 having been blocked by an obstruction 105 in the line-of-sight (LOS) of the primary beam 1, causing the UE 100 and 5G-RAP 110 to select the secondary or reflected beam 2 for wireless communication. Primary or direct path beams 1 may be combinations of beams propagated along a direct line-of-sight (LOS) path and beams propagated along a direction slightly off the line-of-sight. Secondary or reflected path beams have a path substantially off the line-of-sight and have a substantially different angle-of-arrival than line-of-sight, due to reflection at a reflective surface in the transmission path of the secondary or reflected beam.

Primary path beams 1 may be defined as any beam that arrives at the UE, which is the strongest beam(s), including non-line-of-sight beams, as well. Primary path beams may also be defined as any beam weaker by a configured threshold from a predefined maximum strength. The reflected/secondary beams 2 are the beams that are seen as 'good enough', in order to establish a radio link, if the primary beam 1 fails, for example, due to entering deep fading.

Reflected path wireless beams 2 include at least beams propagated along a path that is significantly different from the primary path 1 in terms of at least one of angle-of-arrival and time-difference-of-arrival.

In example embodiments of the invention, there may be two measurement reports that the UE 100 is capable of reporting to the 5G-RAP 110, one report of the primary path beams 1, and second report of the reflected path beams 2 that are 'good enough' based on the signal quality thresholds that are set by the 5G-RAP 110, eNB 101, and/or SON function 104.

The reflected beam is observed by the UE to have a different direction to the UE, than the original beam. It could be identified based on the beam IDs.

In accordance with an example embodiment of the invention, a radio reflection environment map (RREM) 400, shown in FIG. 4, may be constructed at all the locations where a UE 100 may appear in the network. The map constructed based on UE 100 measurements may be maintained locally at the 5G-RAP 110 or forwarded to other network entities which may then use advanced data analytics on the reported measurements to generate the map.

In accordance with an example embodiment of the invention, reflection is used to increase the reliability of high frequency wireless links between the UE 100 and the 5G-RAP 110.

In accordance with an example embodiment of the invention, the UE 100 is configured to report to the 5G-RAP 110 measurements of the strongest or best signal quality primary beam 1 (for mobility), but also measurements of the strongest or best signal quality reflected beams 2 that the UE 100 receives. This, requires a new radio resource control (RRC) measurement configuration to request the UE 100 to report reflected beams 2 to the 5G-RAP 110, based on Angle-of-Arrival of the reflected beam 2 at the UE 100 and the time difference of its arrival with respect to the arrival of primary beam 1. The report may also include link quality based on signal power or quality threshold configurations. The 5G-RAP 110 receives and stores the measurements from the UE 100 and adaptively learns the alternate, reflected paths to reach the UE. The 5G-RAP may also forward the measurements to other entities, such as the SON, to assist in generating the information locally for a cluster of 5G-RAPs.

In accordance with an example embodiment of the invention, the reflection environment (including at least predictive reflection path) is used to enable the 5G-RAP 110 to reach the user experiencing radio link failure through alternate paths.

In accordance with an example embodiment of the invention, using the reflection environment map, the 5G-RAP 110 is aware of all the alternate beams which the data can arrive at the UE 100 (possibly with sub-optimal rates), thereby avoiding further data delivery delays. The alternate reflected path information may also contain the relative link quality degradation information, so that when scheduling data through the reflective path, the 5G-RAP 110 may adapt the modulation and coding scheme (MCS) of the transmissions in order to ensure the required reliability. If the UE can be reached using multiple reflections, rather than by any direct beams, then the data targeted for the UE may be scheduled using these multiple beams (for example using same MCS/Physical resource block (PRB) configuration) so that the combined signal from all the beams received at the UE would be strong enough to successfully decode the packets.

In accordance with an example embodiment of the invention, the UE 100 may then send the uplink (UL) data to the 5G-RAP 110 using a similar reflective path. The UE may use UL beamforming based on the angle-of-arrival measurements of the previous, incoming downlink beam.

In accordance with another example embodiment of the invention, reflective surfaces 115 may be deployed at locations where they can provide coverage enhancements to indoor environments, such as behind furniture, where there is a high probability of non-line-of-sight. The 5G-RAP 110 is configured with the locations of the reflective surfaces 115 so that in the event of a radio link failure (RLF) at locations where there is high probability of no-line-of-sight (NLOS) occurrence, the 5G-RAP 110 may take RLF recovery action by sending the transmissions to the UE 100 with the reflective beam 2 using the reflective surface 115.

In accordance with the example embodiment of the invention shown in FIG. 2, Beam 1 was detected as broken due to an obstacle 105 in the path, such as another user moving into the LOS path, or other dynamic obstructions. Based on the reflection environment map information from the self-organizing network (SON) function 104, 5G-RAP 110 uses Beam 2 to reach the same UE 100. This is performed as soon as the 5G-RAP 110 detects radio link failure (RLF) in Beam 1. Here the SON 104 is mentioned only as an example, since the map information may be generated locally at the 5G-RAP 110 or using any other network operation optimization entities.

In accordance with another example embodiment of the invention, the alternate path(s) 2 between the 5G-RAP 110 and the UE 100 may be dynamically maintained and updated, based on the UE 100 measurements and reports. This approach is suitable for a more dynamic deployment, since it is not advantageous to build a map if it rendered obsolete before it is ready or for a situation where such a map is not yet available. In practice, the benefits may be achieved by configuring the UE 100 to measure and report other beams besides the strongest or best signal quality primary beam. The secondary or reflected beams may be selected based on the criteria that 1) they are directed into a substantially different direction than the primary beam, and 2) they are still strong enough to support communication between the UE 100 and the 5G-RAP 110.

The secondary or reflected beam 2 may be less likely to be blocked by the same obstacle 105 than the primary beam 1. Since the secondary or reflected beams 2 have a substantially different direction, they are more likely to reach the UE 100 via a reflection instead of a direct path. In case signals over the primary beam 1 weaken, the communication may resume over one or more of the secondary or reflected beams 2. This should provide better protection against sudden connection drop due to something blocking the primary link 1 than would an alternative selection of the three strongest or best signal quality primary beams 1, since as those are likely to be all have the same line-of-sight path that is blocked.

Determination of the angle-of-arrival of the beam 2 is done by the UE 100 and is part of the reporting configuration. Beside the strongest or best signal quality primary beam 1, the UE 100 reports other strong beams 2 if received with a substantially different angle-of-arrival. In an alternate embodiment of the invention, the UE 100 may measure and report more beams that are both primary beams 1 and reflected beams 2 and the 5G-RAP 110 selects from those reported measurements the active beams, which may include different beams having different directions. The benefit of doing this is that the UE 100 may separate truly different angles-of-arrival at the UE 100, whereas the 5G-RAP 110 just knows the different reported transmission angles. Depending on the reflections, beams transmitted in different directions by the 5G-RAP 110 may still arrive at UE 100 from almost the same direction. An additional benefit of this online approach, compared to building the reflection map at the 5G-RAP 110, is that the location of the UE 100 does not need to be known to the 5G-RAP 110.

Figure 3:
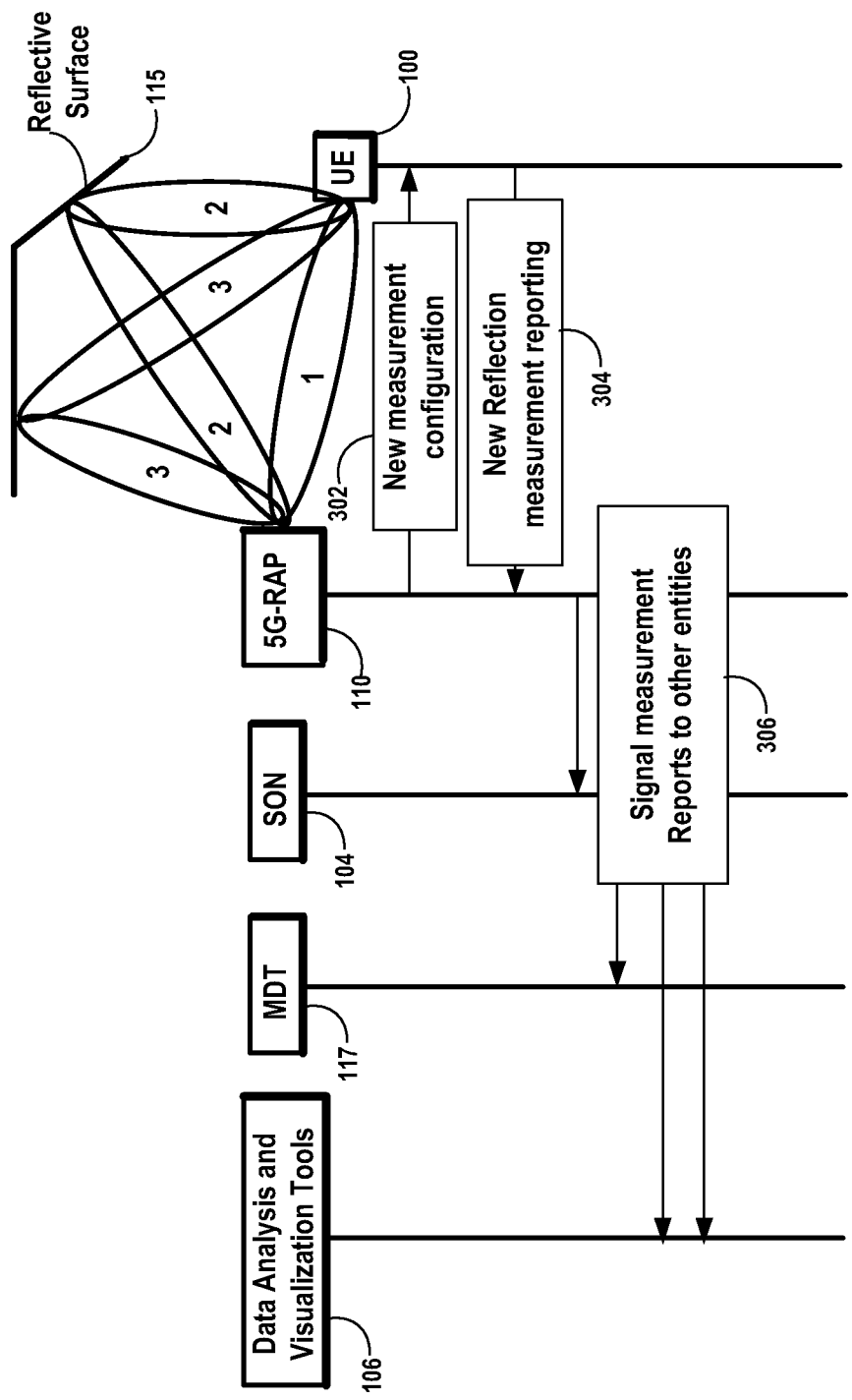
FIG. 3: illustrates an example signaling diagram for the initial/training phase for the UE 100 and 5G-RAP 110, in accordance with an example embodiment of the invention.

FIG. 3: illustrates an example signaling diagram for the initial/training phase for the UE 100 and 5G-RAP 110, in accordance with an example embodiment of the invention. In the initial or training phase, the 5G-RAP 110 configures the UE 100 with additional measurements that are required for generating the new radio reflection environment map. Example additional measurements may include:

In accordance with an example embodiment of the invention, apart from the list of strongest or best channel quality cells and beams, a configurable list of strongest or best channel quality cells and beams/beam IDs that are received as reflections from various sources.

- The UE 100 is estimated to calculate this based on the angle of arrival (AoA) of the beams/beam IDs 2 and compare it with the AoA of the other stronger beams 1 that are arriving directly from the 5G-RAP 110.
- The UE 100 may also be aware of the location of the 5G-RAP 110 using the enhanced cell ID (e-CID) information.
- This requires enhancements in the RRCConnectionReconfiguration message defined for 5G, as compared to 4G, with the new measurement reporting parameters configured.
- This would also require enhancements in the MDT 117 reporting procedure, so that the UE 100 measures and stores this information (in the offline mode) during failure situations such as RLF or even during idle mode, thereby enhancing the information available in the reflection environment map. For example, if a UE 100 encounters RLF at a particular location, based on the enhanced MDT 117 configuration, the UE 100 may store the additional information regarding the reflected beams 2 with beam IDs from various cells, with cell ID information, which is later reported back to the MDT/Trace Collection Entity (TCE) 108.

The sequence for the initial/training phase for the UE 100 and 5G-RAP 110, is shown in the figure as follows:

Step 302: the 5G-RAP transmits a new measurement configuration to the UE 100.

Step 304: the UE 100 transmits new reflection measurements to the 5G-RAP.

Step 306: the 5G-RAP transmits the UE's new reflection measurements to the SON 104, the MDT 117, and the Data Analysis and Visualization Tools 106.

FIG. 4 illustrates an example radio reflection environment map 400 generated based on UE 100 measurements, in accordance with an example embodiment of the invention. In accordance with an example embodiment of the invention, the 5G-RAP 110 first configures the UE 100 to do the new measurements and send the report to the network. Optionally, the 5G-RAP 110 passes on this information to other network optimization entities, which then generate the reflection environment map 400. This may be done in a distributed fashion at the 5G-RAP 110 as well. The main advantage over other centralized approaches is that the best reflected beam 2 for a particular UE 10 may be from a different 5G-RAP, which enables fast coordination when a radio link failure event occurs.

In accordance with an example embodiment of the invention, the example map 400 shown in the figure, is generated based on Beam ID and UE 100 signal strength measurements expressed as Reference Signal Received Power (RSRP). Here the 5G-RAP 110 configures the UE 100 to measure "m" direct beams 1 and "k" reflected beams 2 and constructs the map 400 for an optimized number of locations "n". Here the locations (L) may be optimized based on the locations where there is a high probability of RLF occurrence and/or based on unique locations where a different set of reflected beams 2 are required to ensure coverage and/or recovery from RLF.

Figure 5A:
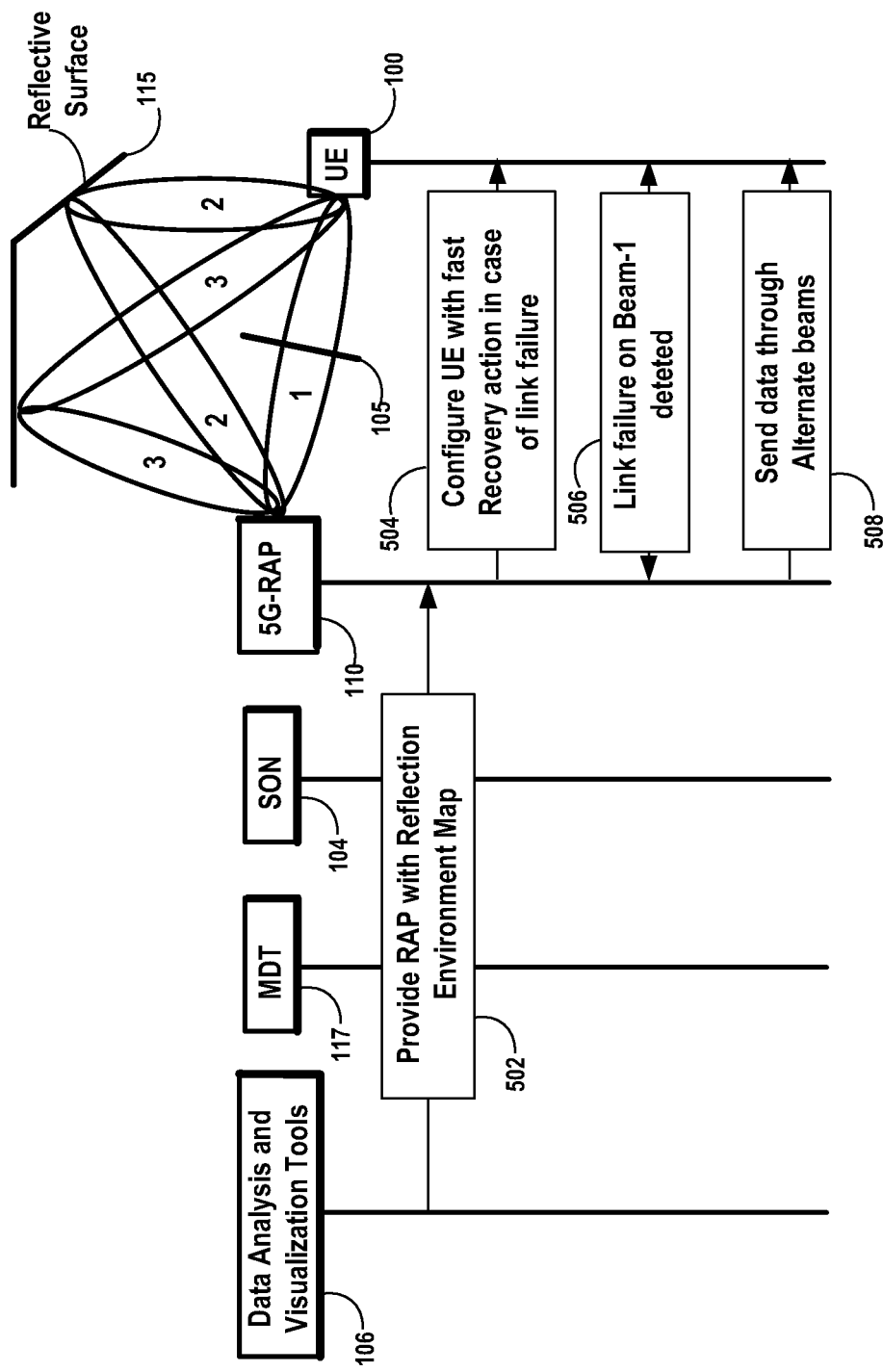
FIG. 5A: illustrates an example signaling diagram for the fast link recovery phase based on the radio reflection environment map 400 generated by the network, in which the primary beam 1 has been blocked by an obstruction 105 in the line-of-sight (LOS) of the primary beam 1, causing the UE 100 and 5G-RAP 110 to select the secondary beam 2 for wireless communication, in accordance with an example embodiment of the invention.

FIG. 5A: illustrates an example signaling diagram for the fast link recovery phase based on the radio reflection environment map 400 generated by the network, in which the primary beam 1 has been blocked by an obstruction 105 in the line-of-sight (LOS) of the primary beam 1, causing the UE 100 and 5G-RAP 110 to select the secondary or reflected beam 2 for wireless communication, in accordance with an example embodiment of the invention.

In accordance with an example embodiment of the invention, the fast recovery process is implemented based on the radio reflection environment map 400 generated by the network. Various options are available regarding the network node where the map 400 is created. It may be either at the 5G-RAP 110 based on assistance information provided by the UE 100, or at other network optimization entities with support from data analytics and visualization tools 106.

- Here the 5G-RAP 110 gets the reflection environment map 400 based on the various methods described earlier and configures the UE 100 with explicit link failure recovery actions.
- This may include the set of alternate cell IDs and/or beam IDs from which the data can be expected in the event of a link failure.
- The map 400 could contain information about the link quality degradation due to reflections which would assist in generating the retransmissions from alternate paths. Based on the maps, 5G-RAP 110 may estimate the link quality based on the joint reception of multiple reflected beams 2 and adjust the transmissions for example allocated resource accordingly as well.
- Based on the map 400, the UE 100 may also be configured with the uplink (UL) beamforming alternatives in case of a link failure as well.
- The 5G-RAP 110 would try to essentially reach the UE 100 through alternate direct and indirect paths simultaneously as well.
- The link failure may be detected when the 5G-RAP 110 does not receive specified signals e.g. sounding signals from the UE 100 for a configured amount of time.

In accordance with an example embodiment of the invention, an example recovery process may be as following. The 5G-RAP 110 detects that UE 100 has entered NLOS condition and lost the direct link through Beam 1. The 5G-RAP 110 tries to reach the UE 100 at location "n" through other beams which were reported as the next best beams. In this case all the direct links are broken. The 5G-RAP 110 then refers to the reflection environment map 400 and based on the UE 100 location, finds the potential beams 2 and 3 that can reach the UE 100 through reflections. Based on the received signal strength measurements of reflections 2 and 3, the 5G-RAP 110 then sends data to the UE 100 using one or a combination of the reflected beams 2 and/or 3. The transmit power of the beams 2 and 3 are adjusted so that the beam or combination of beams have enough strength to deliver the data successfully. The 5G-RAP 110 is able to generate such information from the radio reflection environment map (RREM). Here, one example may be to send the same data over the same PRBs through multiple beams and the UE 110 combines the data it receives. The exact transmission scheme in order to ensure fast recovery process and data delivery may be left to 5G-RAP 110 implementation as well. Since UL in 5G is also using directional beams from the UE 100, which is reciprocal to the downlink beams, the UE 100 may use the angle-of-arrival information of the received beams in order to determine the directionality of the UL beams.

The sequence for the for the fast link recovery phase for the UE 100 and 5G-RAP 110, is shown in the figure as follows:

Step 502: the Data Analysis and Visualization Tools 106 transmits the Reflection Environment Map to the 5G-RAP 110.

Step 504: the 5G-RAP 110 configures the UE 100 with fast Recovery action in case of link failure.

Step 506: the 5G-RAP and the UE 100 detect a Link failure on primary Beam 1.

Step 508: the 5G-RAP and the UE 100 resume communication through alternate beams specified in the Reflection Environment Map.

Figure 5B:
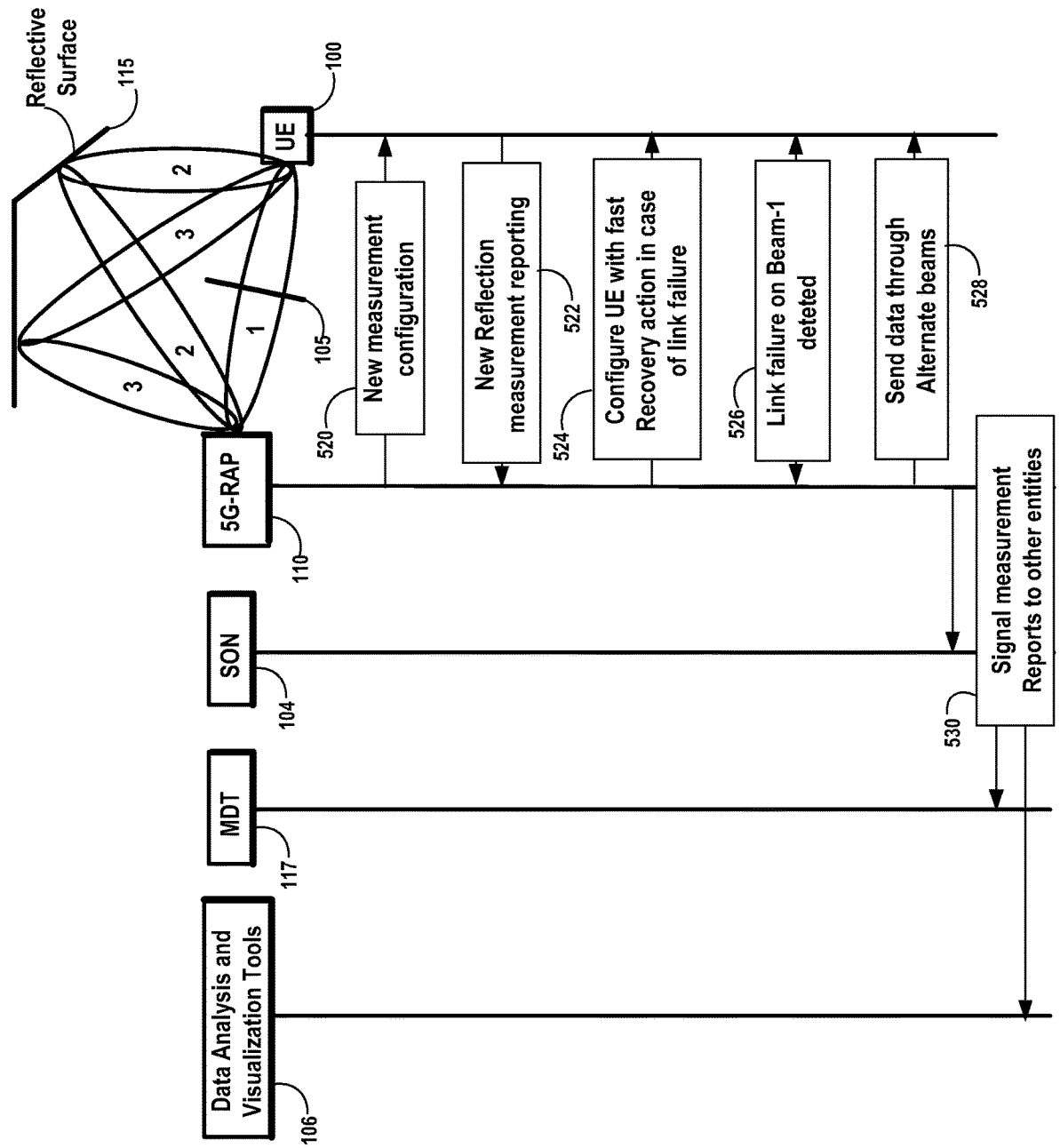
FIG. 5B illustrates another example signaling diagram for the fast link recovery phase, based on the fast recovery configuration message generated by the 5G-RAP, in which the primary beam 1 has been blocked by an obstruction 105 in the line-of-sight (LOS) of the primary beam 1, causing the UE 100 and 5G-RAP 110 to select the secondary beam 2 for wireless communication, in accordance with an example embodiment of the invention.

FIG. 5B illustrates another example signaling diagram for the fast link recovery phase, based on the fast recovery configuration message generated by the 5G-RAP, in which the primary beam 1 has been blocked by an obstruction 105 in the line-of-sight (LOS) of the primary beam 1, causing the UE 100 and 5G-RAP 110 to select the secondary or reflected beam 2 for wireless communication, in accordance with an example embodiment of the invention.

Step 520: the 5G-RAP 110 transmits a new measurement configuration to the UE 100. The measurement configuration request to the UE 100 may be based on Angle-of-Arrival of the reflected beam 2 at the UE 100 and the time difference of its arrival with respect to the arrival of primary beam 1. The measurement configuration request may also specify threshold values for channel quality and received signal strength of the received beams. The measurement configuration request may specify measurement criteria for Angle-of-Arrival of reflected path wireless beams, time difference of arrival of reflected path wireless beams with respect to arrival of received direct path wireless beams, and threshold values for channel quality and receive signal strength of the received direct path wireless beams and received reflected path wireless beams.

The UE 100 then receives from the 5G-RAP, direct path wireless beams and reflected path wireless beams. The UE 100 measures at least a channel quality and angle-of-arrival of the received direct path wireless beams and received reflected path wireless beams, using the new measurement configuration. The UE 100 ranks the received direct path wireless beams and received reflected path wireless beams, based on channel quality.

Step 522: the UE 100 transmits new reflection measurements to the 5G-RAP 110. The UE 100 transmits to the 5G-RAP, at least one report of received direct path wireless beams having a best channel quality and received reflected path wireless beams having best channel quality.

Step 524: the 5G-RAP 110 configures the UE 100 with fast Recovery action in case of link failure. The UE 100 receives from the 5G-RAP, a fast recovery configuration message for fast recovery action in an event of a radio link failure of direct path wireless beams.

Step 526: the 5G-RAP 110 and the UE 100 detect a Link failure on primary Beam 1. The UE 100 detects a radio link failure of direct path wireless beams.

Step 528: the 5G-RAP 110 and the UE 100 resume communication through alternate beams specified in the fast recovery configuration message. The UE 100 exchanges with the 5G-RAP, wireless communications via reflected path wireless beams, under conditions of radio link failure of direct path wireless beams, based on the fast recovery configuration message.

Step 530: the 5G-RAP 110 transmits information on the reflected path wireless beams being used as alternate beams, to the SON 104, the MDT 117, and the Data Analysis and Visualization Tools 106.

Various Implementation Nodes:

In accordance with an example embodiment of the invention, the method is implemented either directly at the 5G-RAP 110, thereby operating in a distributed and independent manner within the network or using other centralized entities. If centralized-RAN assumptions are considered, the map 400 could be generated at the cloud based on combining the measurement report from various UEs 100 from multiple RAPs as well. It could also be implemented on the SON node 104, thereby depending on active state measurements from the end users or on MDT 117 related nodes which enables the measurement reporting of events observed during idle state as well. While the method is mainly applicable for indoor scenarios where there may be a multitude of areas where dynamic obstructions might occur, it is also equally applicable for outdoor scenarios where such enhancements can provide better reliability.

Impact on 5G Standardization:

From a 3GPP 5G standardization perspective, radio resource control (RRC) signaling related to measurements are expected to be impacted. The measurement objects need to be enhanced to consider cell and beam-specific measurements. Reporting configuration needs to be enhanced with separate information elements for the reflection measurements, apart from the relatively weaker direct links/beams. Measurement quantity configuration enhancements for such beam specific measurements would be required, along with optimized measurement gaps, in case multiple beams from different cells are on different frequency bands. There are also enhancements required for MDT 117 storage and reporting functions.

Deployment of Reflective Surface:

In accordance with another example embodiment of the invention, reflective surfaces 115 may be provisioned while deploying the 5G-RAPs 110, locating the reflective surfaces 115 at key locations from where the 5G-RAP 110 may reach the UE 100 through the use of beam reflections. In this embodiment, the surfaces 115 may be placed based on network planning and optionally the 5G-RAP 110 is made aware of the locations where these surfaces 115 are available. The reflection environment map 400 generation method described above may also be applied here to automatically sense the radio environment for possible reflective surfaces 115 that may be used to reach the UEs 100 in potential NLOS regions.

Figure 6A:
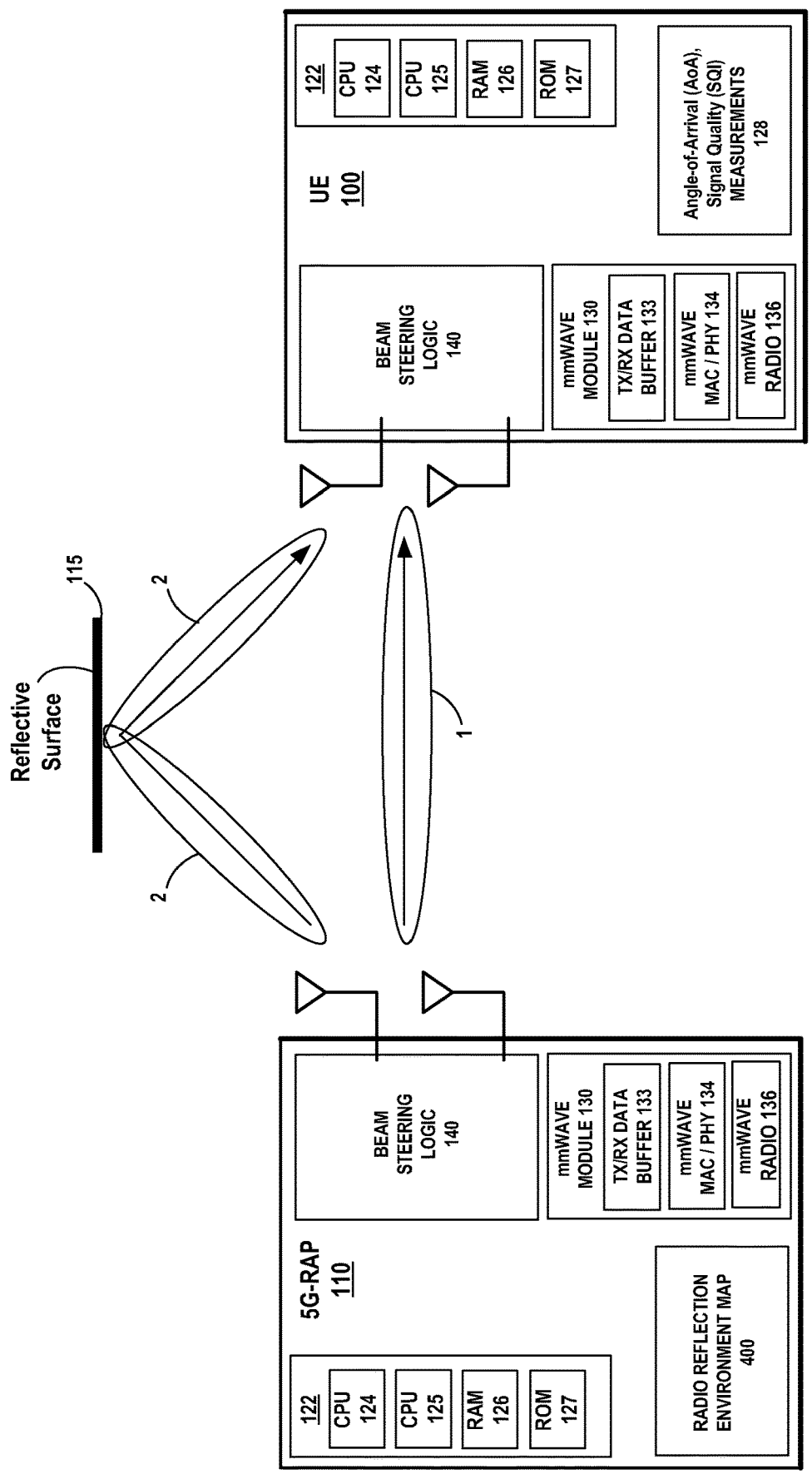
FIG. 6A illustrates a cellular network and functional block diagram of an example network node or 5G-RAP 110 and wireless user equipment (UE) 100 located in a cell controlled by 5G-RAP 110, in accordance with an example embodiment of the invention.

FIG. 6A is a network and functional block diagram of the base station 5G-RAP and the user equipment device UE 100 located in the cell controlled by the base station 5G-RAP, wherein the user equipment device UE synchronizes and registers with the base station 5G-RAP. Device UE has a good mmWave line-of-sight to 5G-RAP and synchronizes and registers over the mmWave band radio link with the base station 5G-RAP.

The UE 100 measures the angle-of-arrival of the primary beams 1 and reflected beams 2 received from the 5G-RAP 110. The UE 100 identifies the strongest or best signal quality received primary beams 1 in the line-of-sight (LOS) and the strongest or best signal quality received reflected beams 2 having a substantially different angle-of-arrival due to reflection at reflective surface 115 in the transmission path of the reflected beam 2. The UE 100 measures the signal quality information SQI of the received beams from the 5G-RAP. The signal quality information SQI, from 5G-RAP to UE for a mmWave channel may be an observed signal-to-interference-plus-noise ratio (SINR) of pilot or reference signals received at the UE. Measurements of angle-of-arrival and signal quality information for received primary beams 1 and reflected beams 2 are buffered by the UE 100 in the buffer 128 and reported to the 5G-RAP 110. The 5G-RAP 110 compiles the measurements received from the UE 100, into the radio reflection environment map 400.

The user device UE is mobile wireless device compatible with the 5th generation (5G) wireless communications technology, which operates in the high frequency millimeter wave (mmWave) band. The base station 5G-RAP is compatible with the 5th generation (5G) wireless communications technology, which operates in the high frequency millimeter wave (mmWave) band.

The user device UE and the 5G-RAP each include a processor module 122, a mmWave module 130, and a beam steering logic 140.

The processor module 122 may include a dual core or multi-core central processing unit 124 and 125, a random access memory (RAM) 126, a read only memory (ROM) 127, and interface circuits to interface with the mmWave module 130, battery or mains power and optionally other power sources. The processor module components may be embodied as hardware, firmware, or software. In an example embodiment of the invention, the user device UE may also optionally include one or more of a key pad, touch screen, display, microphone, speakers, ear pieces, camera or other imaging device, etc. The RAM and ROM may be removable memory device, such as smart cards, SIMs, WIMs, semiconductor memories such as RAM, ROM, PROMS, flash memory device, etc.

The mmWave module 130 may include transmit and receive data buffers TX/RX 133, mmWave media access control (MAC)/physical layer (PHY) 134, and mmWave radio 136 transceiver for high-frequency carriers of between 10 and 300 gigahertz (GHz), in the millimeter-wave band. The mmWave module components may be embodied as hardware, firmware, or software.

For the high frequency millimeter wave (mmWave) band, the antennas in the user device UE and the 5G-RAP are arranged as an array and connected through different phase shifters in the beam steering logic 140 to the mmWave radio 136 transceiver. The beam steering logic 140 performs beamforming by applying analog weight vectors to concentrate radiated energy in specific directions to transmit signals in a spatial beam. Different spatial beams may be transmitted by changing the applied phase shifts. To receive spatial beams, the beam steering logic 140 performs beamforming by applying analog weight vectors to concentrate radiated energy in specific directions to receive transmitted spatial beams. Different spatial beams may be received by changing the applied phase shifts.

Figure 6B:
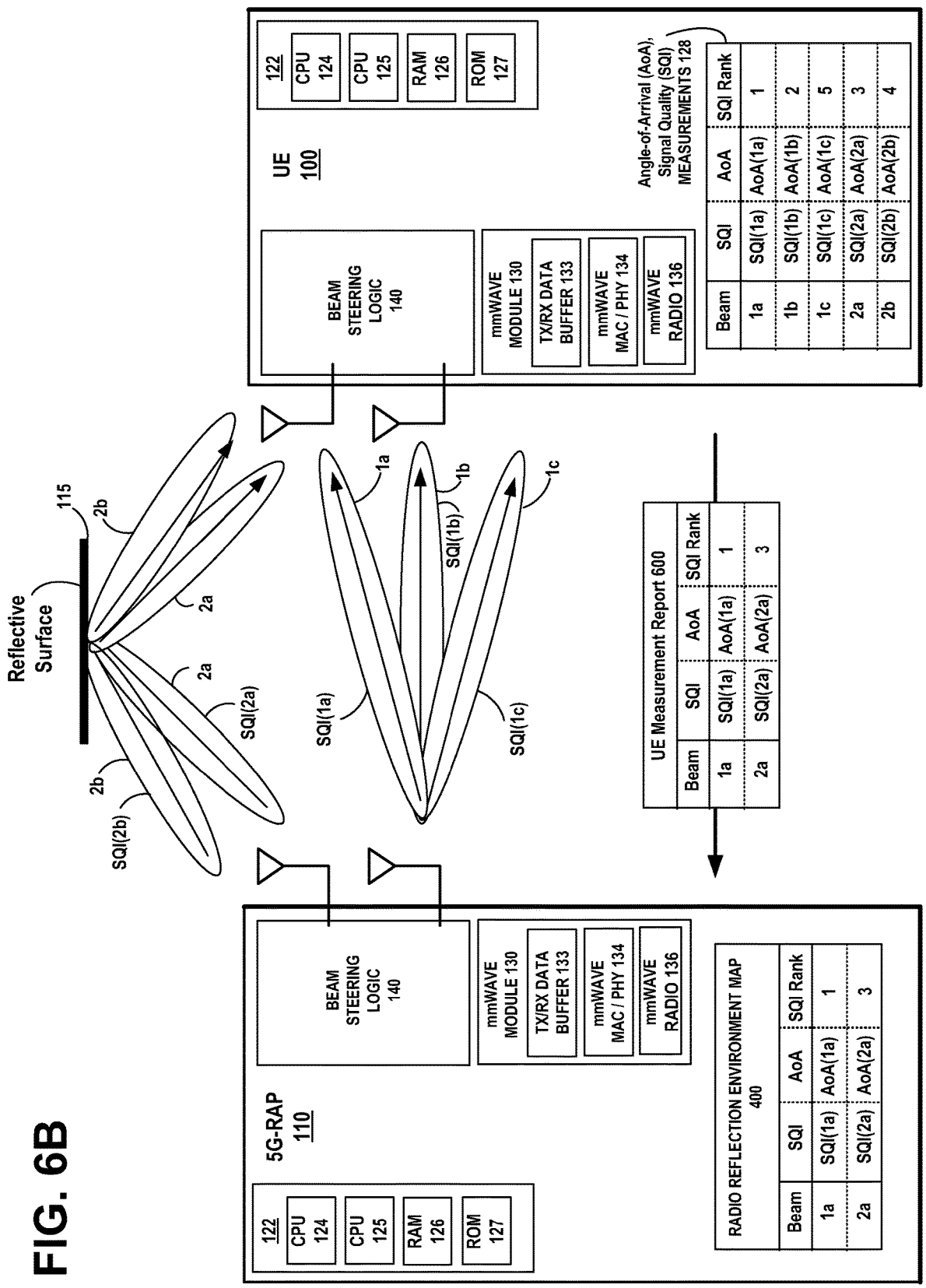
FIG. 6B illustrates a cellular network and functional block diagram of an example network node or 5G-RAP 110 and wireless user equipment (UE) 100 located in a cell controlled by 5G-RAP 110, wherein all of the beams received by the UE 100 are ranked by their respective signal quality and the UE 100 sends a measurement report 600 to the 5G-RAP, that reports the best primary beam and the best reflected beam, in accordance with an example embodiment of the invention.

FIG. 6B illustrates the cellular network and functional block diagram of FIG. 6A, wherein all of the beams received by the UE 100 are ranked by their respective signal quality and the UE 100 sends a measurement report 600 to the 5G-RAP, that reports the one or more of the best primary beams and one or more of the best reflected beams, in accordance with an example embodiment of the invention.

The figure shows the primary beams 1a, 1b, and 1c that have an unobstructed line-of-sight from the 5G-RAP 110 to the UE 100. The primary beams 1a, 1b, and 1c have a signal quality information respectively of SQI (1a), SQI (1b), and SQI (1c). The primary beams 1a, 1b, and 1c have respective angles of arrival of AoA(1a), AoA(1b), and AoA(1c) at the UE 100. Primary beam 1b is shown propagated along a direct line-of-sight path and primary beams 1a and 1c are shown propagated along directions slightly off the direct line-of-sight path.

The figure shows the reflected beams 2a and 2b that are reflected by the reflective surface 115 to have respective angles of arrival of AoA(2a) and AoA(2b) at the UE 100. The reflected beams 2a and 2b have a signal quality information respectively of SQI (2a) and SQI (2b). Secondary or reflected path beams 2a and 2b have paths substantially off the line-of-sight and have a substantially different angle-of-arrival than line-of-sight, due to reflection at reflective surface 115 in the transmission path of the secondary or reflected beam.

All of the beams received by the UE 100 are ranked by their respective signal quality and the measurements and rankings are buffered in the buffer 128 in the UE 100. The figure shows that the primary beam 1a is ranked as the best primary beam by its signal quality. The figure shows that the reflected beam 2a is ranked as the best reflected beam by its signal quality. The UE 100 prepares and sends a measurement report 600 to the 5G-RAP, that reports the one or more of the best primary beams 1a and one or more of the best reflected beams 2a. The measurement report 600 may include link quality based on signal power or quality threshold configurations. The measurement report 600 may report the primary and/or reflected wireless beams having the best overall signal quality for both the primary and reflected beams, and received reflected path wireless beams having the best signal quality among the received reflected path wireless beams.

The 5G-RAP 110 receives and stores the measurements from the UE 100 and adaptively learns the alternate, reflected paths to reach the UE 100. The 5G-RAP 110 may also forward the measurements to other entities, such as the SON 104, to assist in generating the information locally for a cluster of 5G-RAPs.

The figure shows the 5G-RAP 110 compiling the radio reflection environment map 400, which stores descriptions of the one or more of the best primary beams 1a and one or more of the best reflected beams 2a.

FIG. 7A is a flow diagram 700 of a programmed method executed by the UE 100 reporting to the 5G-RAP 110 the best signal quality primary beams 1 and the best signal quality secondary or reflected beams 2 having a substantially different angle-of-arrival due to reflection at reflective surface 115 in the transmission path of the secondary or reflected beam 2, in accordance with an example embodiment of the invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 702: measuring by a user equipment, at least a signal quality and angle-of-arrival of wireless signals received from a network node;

Step 704: determining, by the user equipment, that the received wireless signals include signals from both primary path wireless beams and/or received reflected path wireless beams, based on the signal quality and the angle of arrival of the wireless signals;

Step 706: ranking, by the user equipment, the received wireless signals to primary path wireless beams and/or received reflected path wireless beams, based on the signal quality; and Step 708: transmitting, by the user equipment, to the network node, at least one report including indications of both the received primary wireless beams having the best overall signal quality among both the primary and reflected beams, and received reflected path wireless beams having the best signal quality among the received reflected path wireless beams.

FIG. 7B is a flow diagram 750 of a programmed method executed by the 5G-RAP 110 compiling a radio reflection environment map 400 based on a measurement report 600 received from the UE 100, indicating the best signal quality primary beams 1 and the best signal quality reflected beams 2 received by the UE 100 having a substantially different angle-of-arrival due to reflection at reflective surface 115 in the transmission path of the secondary or reflected beam 2, in accordance with an example embodiment of the invention. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 752: receiving, by a network node, from a user equipment, at least one report of measurements by the user equipment of received primary path wireless beams, having a best signal quality and received reflected path wireless beams having best signal quality among the received reflected path wireless beams;

Step 754: transmitting, by the network node to the user equipment, a configuration for a recovery action in case of a link failure, based on the received measurement report; and Step 756: communicating, by the network node with the user equipment, via reflected path wireless beams, under conditions of radio link failure of primary path wireless beams.

Figure 8:
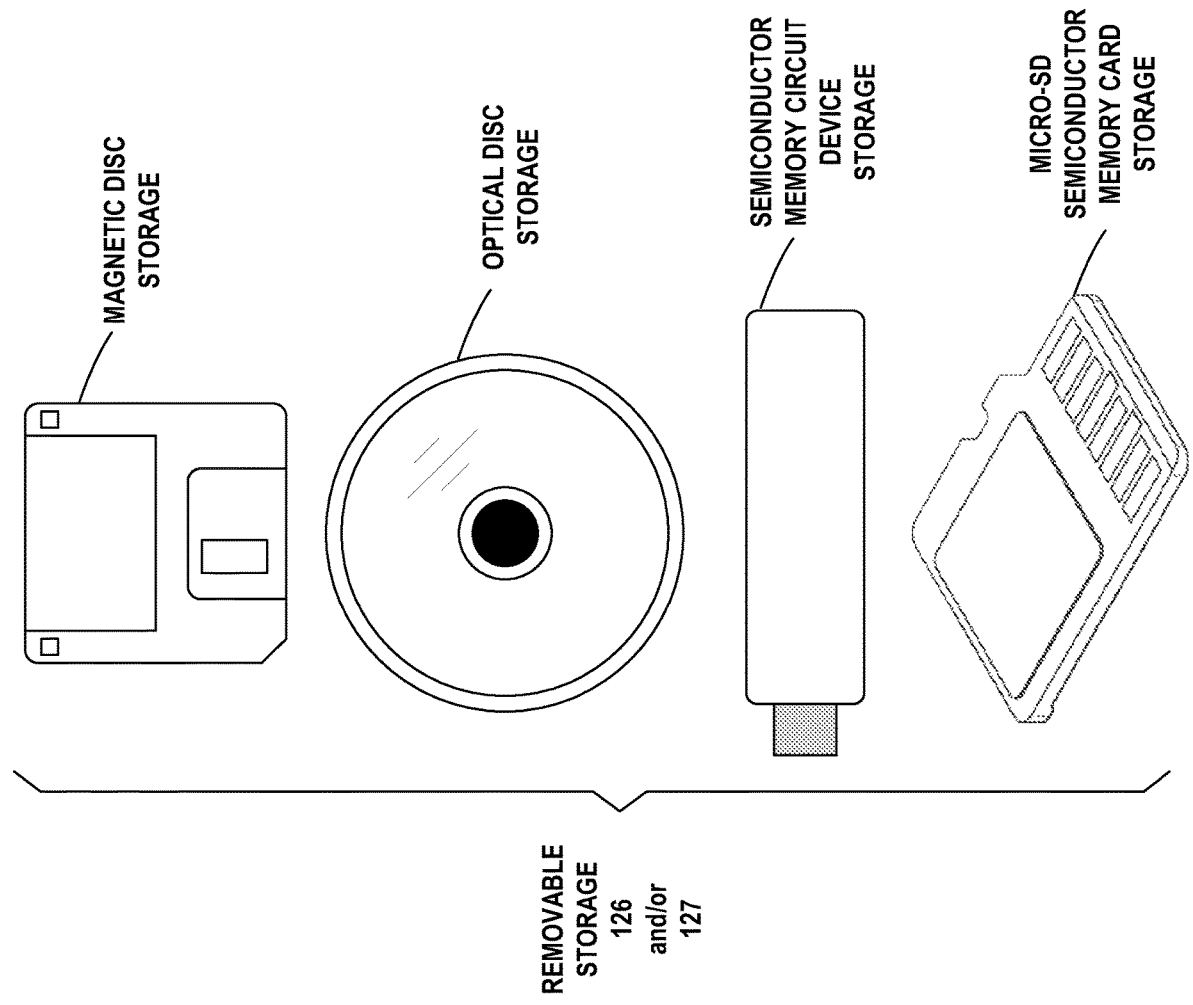
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 8 illustrates an example embodiment of the invention, wherein examples of removable storage media are shown for RAM and/or ROM memories 126/156 and/or 127/157, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   measuring by a user equipment, at least a signal quality and angle-of-arrival of wireless signals received from a network node;
   determining, by the user equipment, that the received wireless signals include signals from both primary path wireless beams and received reflected path wireless beams, based on the signal quality and the angle of arrival of the wireless signals;
   ranking, by the user equipment, the received wireless signals to primary path wireless beams and received reflected path wireless beams, based on the signal quality;
   transmitting, by the user equipment, to the network node, at least one report including indications of both the received primary wireless beams having the best overall signal quality among both the primary and reflected beams, and received reflected path wireless beams having the best signal quality among the received reflected path wireless beams;
   receiving, by the user equipment, from the network node, a recovery configuration message for recovery action in an event of a radio link failure of primary path wireless beams;
   detecting, by the user equipment, a radio link failure of primary path wireless beams; and
   exchanging, by the user equipment, with the network node, wireless communications via reflected path wireless beams, under conditions of radio link failure of primary path wireless beams, based on the recovery configuration message,
   wherein the wireless communications via the reflected path wireless beams have a same modulation and coding scheme and physical resource block configuration for all of the of the reflected path wireless beams, based on the recovery configuration message, which provides a combined signal that is strong enough to be decoded when exchanged by the user equipment with the network node.

2. The method of claim 1, wherein the user equipment is located in a cell controlled by the network node and the network node is a cellular base station, which operates in a high frequency band.

3. The method of claim 1, wherein the user equipment transmits uplink data to the network node using the same path as used by the reflected path wireless beams, under the conditions of radio link failure of primary path wireless beams.

4. The method of claim 1, wherein the at least one report includes information on signal quality and angle-of-arrival of received primary path wireless beams and signal quality and angle-of-arrival of received reflected path wireless beams having a substantially different angle-of-arrival than that of the received primary path wireless beams.

5. The method of claim 1, wherein the recovery configuration message includes information on paths for the reflected path wireless beams.

6. The method of claim 1, further comprising:
receiving, by the user equipment, from the network node, a measurement configuration specifying measurement criteria for at least one of Angle-of-Arrival of reflected path wireless beams, time difference of arrival of reflected path wireless beams with respect to arrival of received primary path wireless beams, threshold values for signal quality or threshold values for received signal strength of the received primary path wireless beams and received reflected path wireless beams.

7. An apparatus, comprising:
at least one processor;
at least one memory including computer program code;
the at least one memory and the computer program code configured to, with the at least one processor, cause the apparatus at least to:
measure at least a signal quality and angle-of-arrival of wireless signals received from a network node;
determine that the received wireless signals include signals from both primary path wireless beams and received reflected path wireless beams, based on the signal quality and the angle of arrival of the wireless signals;
rank the received wireless signals to primary path wireless beams and received reflected path wireless beams, based on the signal quality;
transmit to the network node, at least one report including indications of both the received primary wireless beams having the best overall signal quality among both the primary and reflected beams, and received reflected path wireless beams having the best signal quality among the received reflected path wireless beams;
receive from the network node, a recovery configuration message for recovery action in an event of a radio link failure of primary path wireless beams;
detect a radio link failure of primary path wireless beams; and
exchange with the network node, wireless communications via reflected path wireless beams, under conditions of radio link failure of primary path wireless beams, based on the recovery configuration message,
wherein the wireless communications via the reflected path wireless beams have a same modulation and coding scheme and physical resource block configuration for all of the of the reflected path wireless beams, based on the recovery configuration message, which provides a combined signal that is strong enough to be decoded when exchanged by the user equipment with the network node.

8. The apparatus of claim 7, wherein primary path wireless beams include at least one of beams propagated along a direct line-of-sight path or beams propagated along a direction slightly off the direct line-of-sight path.

9. The apparatus of claim 7, wherein reflected path wireless beams include at least beams propagated along a path that is significantly different from the primary path in terms of at least one of angle-of-arrival and time-difference-of-arrival.

10. The apparatus of claim 7, wherein the user equipment is located in a cell controlled by the network node and the network node is a cellular base station, which operates in a high frequency band.

11. The apparatus of claim 7, wherein the user equipment transmits uplink data to the network node using the same path as used by the reflected path wireless beams, under the conditions of radio link failure of primary path wireless beams.

12. The apparatus of claim 7, wherein the at least one report includes information on signal quality and angle-of-arrival of received primary path wireless beams and signal quality and angle-of-arrival of received reflected path wireless beams having a substantially different angle-of-arrival than that of the received primary path wireless beams.

13. The apparatus of claim 7, wherein the recovery configuration message includes information on paths for the reflected path wireless beams.

14. The apparatus of claim 7, further comprising:
the at least one memory and the computer program code configured to, with the at least one processor, cause the apparatus at least to:
receive from the network node, a measurement configuration specifying measurement criteria for at least one of Angle-of-Arrival of reflected path wireless beams, time difference of arrival of reflected path wireless beams with respect to arrival of received primary path wireless beams, threshold values for signal quality or threshold values for received signal strength of the received primary path wireless beams and received reflected path wireless beams.

15. An apparatus, comprising:
at least one processor;
at least one memory including computer program code;
the at least one memory and the computer program code configured to, with the at least one processor, cause the apparatus at least to:
receive from a user equipment, at least one report of measurements by the user equipment of received primary path wireless beams, having a best signal quality and received reflected path wireless beams having best signal quality among the received reflected path wireless beams;
transmit to the user equipment, a configuration for a recovery action in case of a link failure, based on the received measurement report; and
communicate with the user equipment, via reflected path wireless beams, under conditions of radio link failure of primary path wireless beams,
wherein wireless communications via the reflected path wireless beams have a same modulation and coding scheme and physical resource block configuration for all of the of the reflected path wireless beams, based on the configuration for a recovery action, which provides a combined signal that is strong enough to be decoded when exchanged by the user equipment with the network node.

16. The apparatus of claim 15, further comprising:

the at least one memory and the computer program code configured to, with the at least one processor, cause the apparatus at least to:

transmit to a self-organizing network function, information on the reflected path wireless beams used under the conditions of radio link failure of primary path wireless beams.

17. The apparatus of claim 15, further comprising:

the at least one memory and the computer program code configured to, with the at least one processor, cause the apparatus at least to:

transmit to the user equipment, a measurement configuration specifying measurement criteria for Angle-of-Arrival of reflected path wireless beams, time difference of arrival of reflected path wireless beams with respect to arrival of received primary path wireless beams, and threshold values for signal quality and threshold values for received signal strength of the received primary path wireless beams and received reflected path wireless beams.

18. The apparatus of claim 15, wherein the at least one report includes information on signal quality and angle-of-arrival of received primary path wireless beams and signal quality and angle-of-arrival of received reflected path wireless beams having a substantially different angle-of-arrival than that of the received primary path wireless beams.

* * * * *